US010872356B2

(12) United States Patent
Lewis et al.

(10) Patent No.: US 10,872,356 B2
(45) Date of Patent: Dec. 22, 2020

(54) METHODS, SYSTEMS, AND MEDIA FOR PRESENTING ADVERTISEMENTS DURING BACKGROUND PRESENTATION OF MEDIA CONTENT

(71) Applicant: GOOGLE LLC, Mountain View, CA (US)

(72) Inventors: Justin Lewis, Marina Del Ray, CA (US); Gavin James, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 1347 days.

(21) Appl. No.: 14/302,049

(22) Filed: Jun. 11, 2014

(65) Prior Publication Data

US 2015/0363837 A1    Dec. 17, 2015

(51) Int. Cl.
*G06Q 30/02*    (2012.01)
(52) U.S. Cl.
CPC ..... *G06Q 30/0277* (2013.01); *G06Q 30/0241* (2013.01); *G06Q 30/0251* (2013.01); *G06Q 30/0264* (2013.01)
(58) Field of Classification Search
CPC ............... G06Q 30/02; G06Q 30/0241; G06Q 30/0251; G06Q 30/0264
See application file for complete search history.

(56) References Cited

U.S. PATENT DOCUMENTS

| | | | | |
|---|---|---|---|---|
| 9,204,205 | B1* | 12/2015 | Pasula | H04N 21/812 |
| 2002/0178447 | A1* | 11/2002 | Plotnick | H04N 21/4532 |
| | | | | 725/36 |
| 2007/0239546 | A1* | 10/2007 | Blum | G06Q 30/02 |
| | | | | 705/14.47 |
| 2008/0319839 | A1* | 12/2008 | Olliphant | G06Q 30/02 |
| | | | | 705/14.54 |
| 2009/0006191 | A1* | 1/2009 | Arankalle | G06Q 30/02 |
| | | | | 705/14.71 |

(Continued)

OTHER PUBLICATIONS

Liao, "Methods, Systems, and Media for Presenting Video Content Items" (published in The IP.com Prior Art Database on May 2, 2014) (Year: 2014).*

(Continued)

*Primary Examiner* — Abhishek Vyas
*Assistant Examiner* — Patrick Kim
(74) *Attorney, Agent, or Firm* — Foley & Lardner LLP

(57) ABSTRACT

In accordance with some embodiments, methods for presenting advertisements during video presentation are provided, the methods comprising: receiving a media content item to be presented, wherein the media content item comprises video content that includes audio data to be presented during presentation of the video data; determining that a video presentation application is in a presentation mode that inhibits video data; receiving an advertisement to be presented during presentation of the media content item; causing the media content item to be presented in the presentation mode; causing the advertisement to be presented during presentation of the media content; detecting a user action indicative of user attention to at least a portion of the presented advertisement; and performing a further action in response to detecting the user action, which causes information other than the advertisement to be presented by the user interface.

15 Claims, 7 Drawing Sheets

(56) References Cited

U.S. PATENT DOCUMENTS

| | | |
|---|---|---|
| 2009/0165041 A1 | 6/2009 | Penberthy et al. |
| 2009/0198579 A1* | 8/2009 | Lewis ................ G06Q 30/0248 |
| | | 705/14.47 |
| 2011/0041062 A1 | 2/2011 | Singer et al. |
| 2011/0126102 A1 | 5/2011 | Archer |
| 2011/0153426 A1* | 6/2011 | Reddy ................ G06Q 30/0261 |
| | | 705/14.58 |
| 2012/0158492 A1 | 6/2012 | Ye et al. |
| 2013/0209065 A1* | 8/2013 | Yeung ................ H04N 21/4622 |
| | | 386/248 |
| 2015/0074204 A1* | 3/2015 | Burcham ................ H04L 51/14 |
| | | 709/206 |

OTHER PUBLICATIONS

International Preliminary Report on Patentability and Written Opinion dated Dec. 22, 2016 in International Patent Application No. PCT/US2015/035390.

International Search Report dated Dec. 18, 2015 in International Patent Application No. PCT/US2015/035390.

Examination Report for EP Appln. Ser. No. 15795244.1 dated Jan. 29, 2020 (6 pages).

First Office Action for Cn Appin. U.S. Appl. No. 201580031012.3 dated Jan. 22, 2020 (17 pp.) X.

Second Office Action for CN Appln. Ser. No. 201580031012.3 dated Aug. 10, 2020 (10 pages).

* cited by examiner

US 10,872,356 B2

METHODS, SYSTEMS, AND MEDIA FOR PRESENTING ADVERTISEMENTS DURING BACKGROUND PRESENTATION OF MEDIA CONTENT

TECHNICAL FIELD

Methods, systems, and media for presenting advertisements during background presentation of media content are provided.

BACKGROUND

Mobile devices have become a platform for advertising, especially given the widespread and immediate access that users have to mobile devices. Many users interact with multiple applications at the same time using mobile devices or use an application while focusing on other tasks. For example, users will often use applications for delivering and presenting media content such as video and/or audio. Typically, advertisements are presented when users are interacting with a media content application.

Accordingly, it is desirable to provide systems, methods, and media for presenting advertisements during background presentation of media content.

SUMMARY

In accordance with some embodiments of the disclosed subject matter, mechanisms for presenting advertisements during background presentation of media content are provided.

In accordance with some embodiments of the disclosed subject matter, methods for presenting advertisements during video presentation are provided, the methods comprising: receiving a media content item to be presented, wherein the media content item comprises video content that includes audio data to be presented during presentation of the video data; determining that a video presentation application installed on a user device is in a presentation mode that inhibits video data of the media content item from being presented on the user device; receiving an advertisement to be presented in a user interface during presentation of the media content item; causing the media content item to be presented using the video presentation application in the presentation mode; causing the advertisement to be presented on the user device during presentation of the media content; detecting a user action indicative of user attention to at least a portion of the presented advertisement; and performing a further action in response to detecting the user action, which causes information other than the advertisement to be presented by the user interface.

In accordance with some embodiments of the disclosed subject matter, systems for presenting advertisements during video presentation are provided, the systems comprising at least one hardware processor that is programmed to: receive a media content item to be presented, wherein the media content item comprises video content that includes audio data to be presented during presentation of the video data; determine that a video presentation application installed on a user device is in a presentation mode that inhibits video data of the media content item from being presented on the user device; receive an advertisement to be presented in a user interface during presentation of the media content item; cause the media content item to be presented using the video presentation application in the presentation mode; cause the advertisement to be presented on the user device during presentation of the media content; detect a user action indicative of user attention to at least a portion of the presented advertisement; and perform a further action in response to detecting the user action, which causes information other than the advertisement to be presented by the user interface.

In accordance with some embodiments of the disclosed subject matter, non-transitory computer readable media containing computer executable instructions that, when executed by a processor, cause the processor to perform methods for presenting advertisements during video presentation are provided, the methods comprising: receiving a media content item to be presented, wherein the media content item comprises video content that includes audio data to be presented during presentation of the video data; determining that a video presentation application installed on a user device is in a presentation mode that inhibits video data of the media content item from being presented on the user device; receiving an advertisement to be presented in a user interface during presentation of the media content item; causing the media content item to be presented using the video presentation application in the presentation mode; causing the advertisement to be presented on the user device during presentation of the media content; detecting a user action indicative of user attention to at least a portion of the presented advertisement; and performing a further action in response to detecting the user action, which causes information other than the advertisement to be presented by the user interface.

In accordance with some embodiments of the disclosed subject matter, a system for presenting advertisements during video presentation is provided, the system comprising: means for receiving a media content item to be presented, wherein the media content item comprises video content that includes audio data to be presented during presentation of the video data; means for determining that a video presentation application installed on a user device is in a presentation mode that inhibits video data of the media content item from being presented on the user device; means for receiving an advertisement to be presented in a user interface during presentation of the media content item; means for causing the media content item to be presented using the video presentation application in the presentation mode; means for causing the advertisement to be presented on the user device during presentation of the media content; detecting a user action indicative of user attention to at least a portion of the presented advertisement; and means for performing a further action in response to detecting the user action, which causes information other than the advertisement to be presented by the user interface.

In some embodiments, the system further comprises means for causing the audio data of the media content item to be presented by a remote device.

In some embodiments, the advertisement is first caused to be presented at a point in time corresponding to at least one of: a beginning of the media content item, an end of the media content item, and a point between the beginning and the end of the media content item.

In some embodiments, the system further comprises: means for determining that a pre-determined period of time has elapsed since the advertisement was first presented; and means for causing an additional advertisement to be presented, in response to determining that the pre-determined period of time has elapsed.

In some embodiments, the advertisement and the additional advertisement are presented as a plurality of advertisements and the plurality of advertisements are configured in a queue.

In some embodiments, the system further comprises: means for determining a number of advertisements in the queue for presentation; means for determining that the number of advertisements in the queue is greater than or equal to a threshold number of advertisements; and means for causing the presentation of the media content item to be inhibited in response to determining that the number of advertisements is greater than or equal to the threshold.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with some embodiments of the disclosed subject matter, mechanisms (which can include methods, systems and media) for presenting advertisements during background presentation of media content are provided.

In accordance with some embodiments, advertisements can be presented on mobile devices during background presentation of media content such as video and/or audio. For example, background presentation of video content can include the presentation of the audio content, but not the video content. As yet another example, background presentation of media content can include presenting the media content using a first application during concurrent execution of one or more other applications that can each present text data, image data, audio data and/or video data, send/or receive data, and/or perform any other suitable actions. In some embodiments, background presentation of media content can include the presentation of image data (e.g., thumbnails associated with the media content), but not the video and/or audio data. In some embodiments, background presentation of media content can include video data and/or image data presented in a smaller amount and/or at a lower resolution. In some embodiments, advertisements can be selected for presentation based on a correlation to content associated with a user device, such as applications installed on the user device. In some embodiments, the media content can be presented on a remote device (such as a television) and the advertisements can be presented on the user device. In accordance with some embodiments, the presence of one or more advertisements can cause the presentation of video and/or audio data to be inhibited, thereby prompting an interaction with the user in order to resume presentation of the media content.

Figure 1:
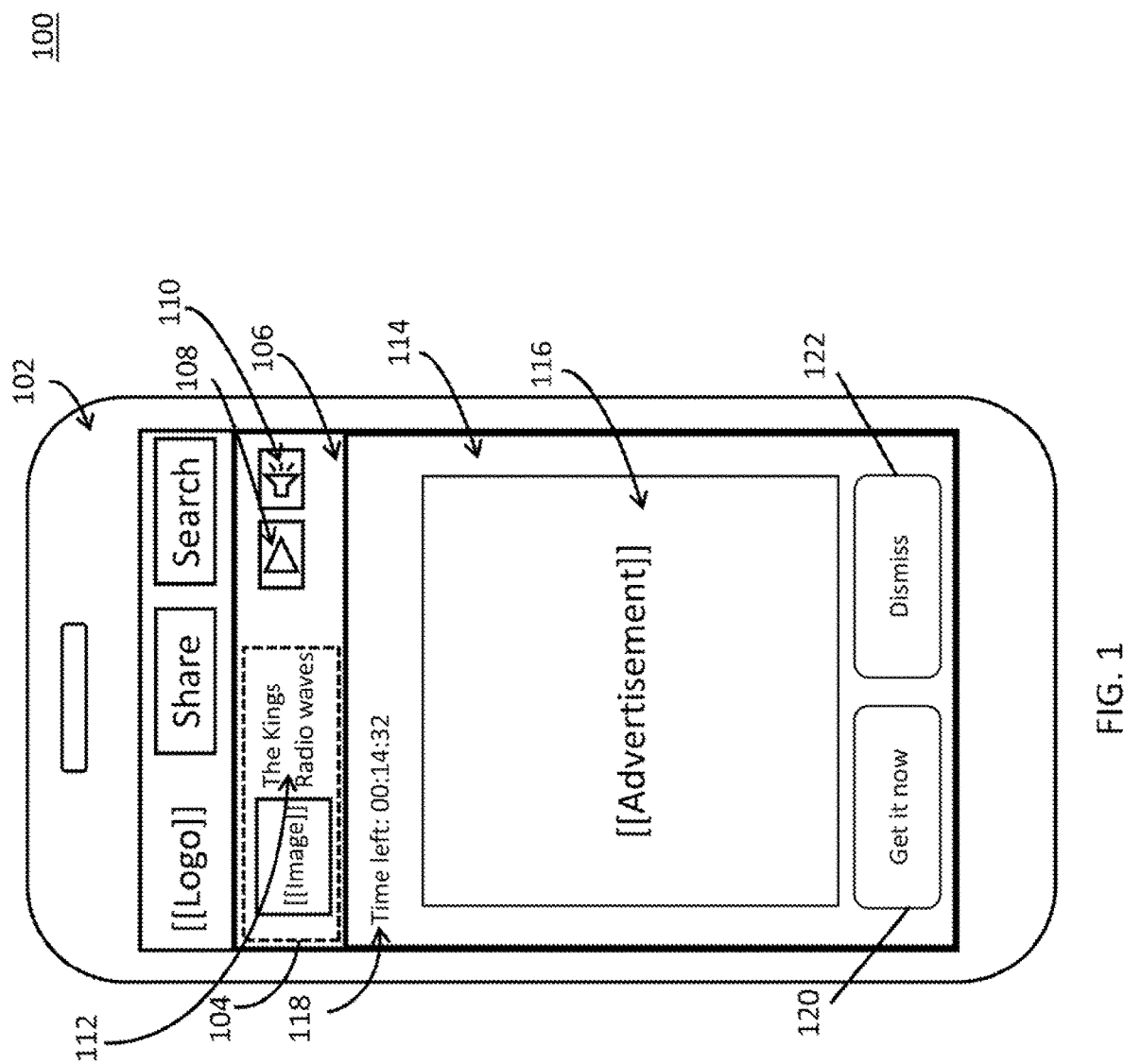
FIG. 1 shows an example of a user interface for presenting advertisements during background presentation of media content in accordance with some embodiments of the disclosed subject matter.

Turning to FIG. 1, an example 100 of a user interface for presenting advertisements during background presentation of media content is shown in accordance with some embodiments of the disclosed subject matter. As illustrated, user interface 100 can be presented by user device 102 and can include a media content item 104, a media presentation portion 106, and an advertisement presentation portion 114 that can include an advertisement timer 118, advertisement 116, and advertisement interaction elements 120 and 122.

Media content 104 can be any suitable media content item which is currently being presented, was presented, and/or is about to be presented. For example, in some embodiments, media content item 104 can include any suitable video content, audio content, image content, document content, and/or any other suitable content. As a more particular example, media content item 104 can include content such as television programs, movies, music videos, cartoons, sound effects, audio books, streaming live content (e.g., a streaming radio show, live concert show, and/or any other suitable type of streaming live content), user generated content, and/or any other suitable type of media content.

Media presentation portion 106 can be any suitable portion of user interface 100 within which media content 104 can be presented. Media presentation portion 106 can have any suitable appearance. For example, in some embodiments, media presentation portion 106 can include a window in a user interface (e.g., user interface 100) in which media content 104 is presented. As another example, media presentation portion 106 can be presented in a separate window such as a pop-up window that covers at least a portion of user interface 100. As yet another example, in some embodiments, media presentation portion 106 can include player controls, such as a volume control element 110, a play control element 108, social interaction control elements such as a share element, an element for indicating approval and/or disapproval of media content 104, a search element and/or any other suitable user interface elements. In some embodiments, media presentation portion 106 can include the presentation of the audio portion of a video content item, and/or the presentation of an image and/or video within media presentation portion 106 such as a thumbnail or any other suitable presentation of the media content.

Play control element 108 and volume control element 110 can be used to control the presentation of media content item 104. For example, in some embodiments, play control element 108 can be used to initiate, pause, and/or resume the presentation of media content item 104. In some such embodiments, if play control element 108 is selected (e.g., by clicking with a mouse, tapping on a touch screen, and/or any other suitable selection technique), play control element 108 can be presented as a pause symbol (not shown). As another example, selection of volume control element 110 can cause the volume at which audio data of the media content item 104 is presented, to be changed.

Title 112 can indicate a title associated with media content item 104 in any suitable manner. For example, as shown in FIG. 1, title 112 can include a block of text. In some embodiments, title 112 can include any other suitable information, such as a creator of media content item 104, a date associated with media content item 104 (e.g., a date of upload, a date of creation, and/or any other suitable date), a number of times media content item 104 has been requested and/or viewed, and/or any other suitable information. In some embodiments, title 112 can include any suitable images, icons, animations, and/or any other suitable content. In some embodiments, title 112 can be omitted.

Advertisement presentation portion 114 can be any suitable portion of user interface 100 that can be used to present advertisement 116. Advertisement portion 114 can have any suitable appearance. For example, in some embodiments, advertisement presentation portion 114 can include an advertisement timer 118 indicating an amount of time for which the advertisement will be presented. As another example, advertisement presentation portion 114 can be presented in a separate window on the user device when the media content item 104 is sent to a remote device. As yet another example, in some embodiments, advertisement presentation portion 114 can include user interaction elements 120 and 122, such that the user can interact with the advertisement causing user device 102 to take further action. For example, in some embodiments, selection of advertisement interaction element 120 can cause user device 102 to take further action such as causing the presentation of an application for the purchase of an item advertised and/or service advertised presented in advertisement 116, and/or any other suitable action. In some embodiments, selection of advertisement interaction element 122 can cause advertisement 116 to be dismissed by clearing advertisement presentation portion 114 and/or by causing any other suitable action.

Advertisement 116 can be any suitable advertisement which is currently being presented, was presented and/or is about to be presented. For example, advertisement 116 can be an interstitial advertisement that may interrupt a normal flow of the media content item and require user attention to dismiss. As another example, advertisement 116 can be an in-stream advertisement that may or may not interrupt a normal flow of the media content, but may not require user attention to dismiss. As yet another example, advertisement 116 can be a notification advertisement and/or a companion advertisement that can appear as banners and/or full images presented in any suitable portion of user interface 100 that can be used to present advertisement 116. In some embodiments, advertisement 116 can include suitable content such as image content, video content, audio content, text content, and/or any suitable content.

Figure 2:
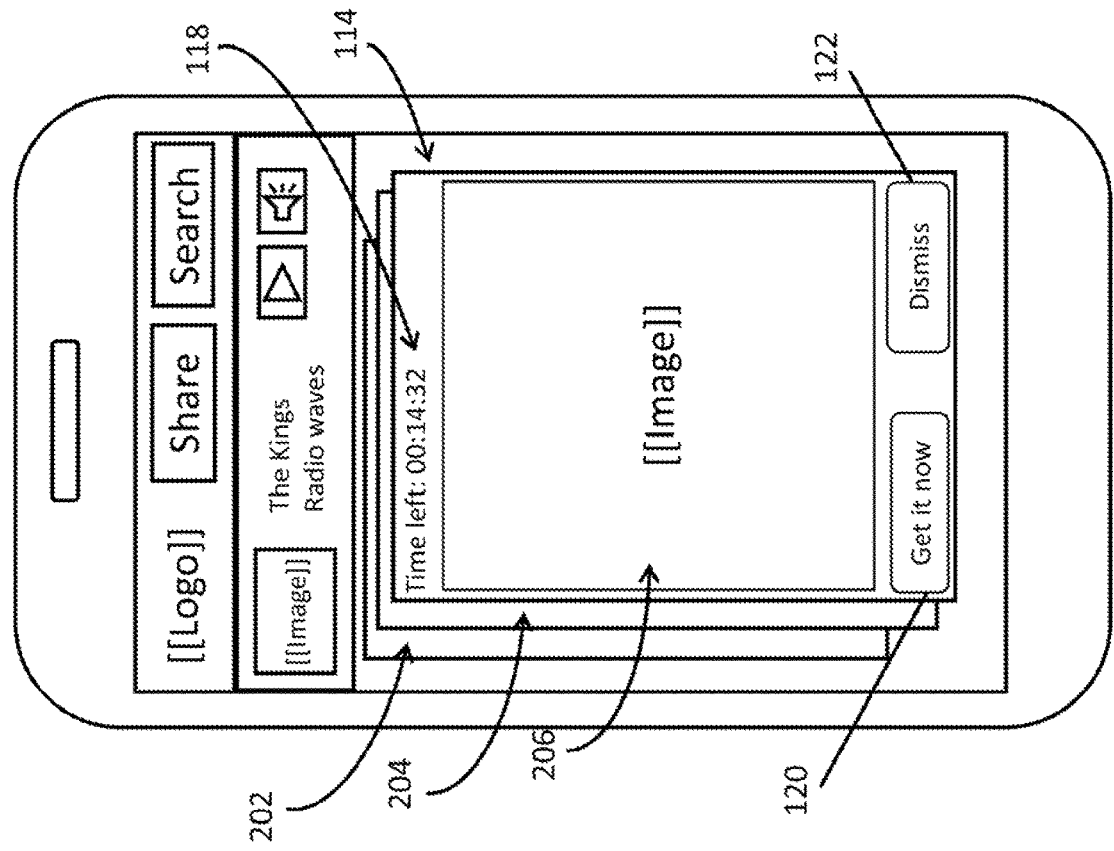
FIG. 2 shows an example of a user interface for presenting multiple advertisements during background presentation of media content in accordance with some embodiments of the disclosed subject matter.

FIG. 2 shows an example 200 of a user interface for presenting multiple advertisements in accordance with some embodiments of the disclosed subject matter. As shown in FIG. 2, multiple advertisements 202-206 can be presented using advertisement presentation portion 114. For example, in some embodiments, advertisement timer 118 can indicate a period of time after which a user can be prompted to interact with advertisement 206 using advertisement interaction elements 120 and/or 122. In some embodiments, failure to interact with one or more of advertisement 202 within a pre-determined period of time, a remaining portion of which can be indicated by timer 118, can cause the advertisement presentation window to queue an additional advertisement 204 for presentation such that advertisements 202 and 204 can be arranged one after the other, one next to each other or in any other suitable arrangement. In some such embodiments, further inaction from the user can cause additional advertisement 206 to be presented and added to the existing queue of advertisements. In accordance with some embodiments, a certain number of advertisements can be queued. Once the number is reached, presentation of the media content item can be inhibited and user interface 200 can prompt the user to interact with advertisements 202-206 using advertisement interaction elements 120 and 122. In some embodiments, advertisements 202-206 can be placed in a queue and only some portion or no portion of the advertisement content may be shown.

Figure 3:
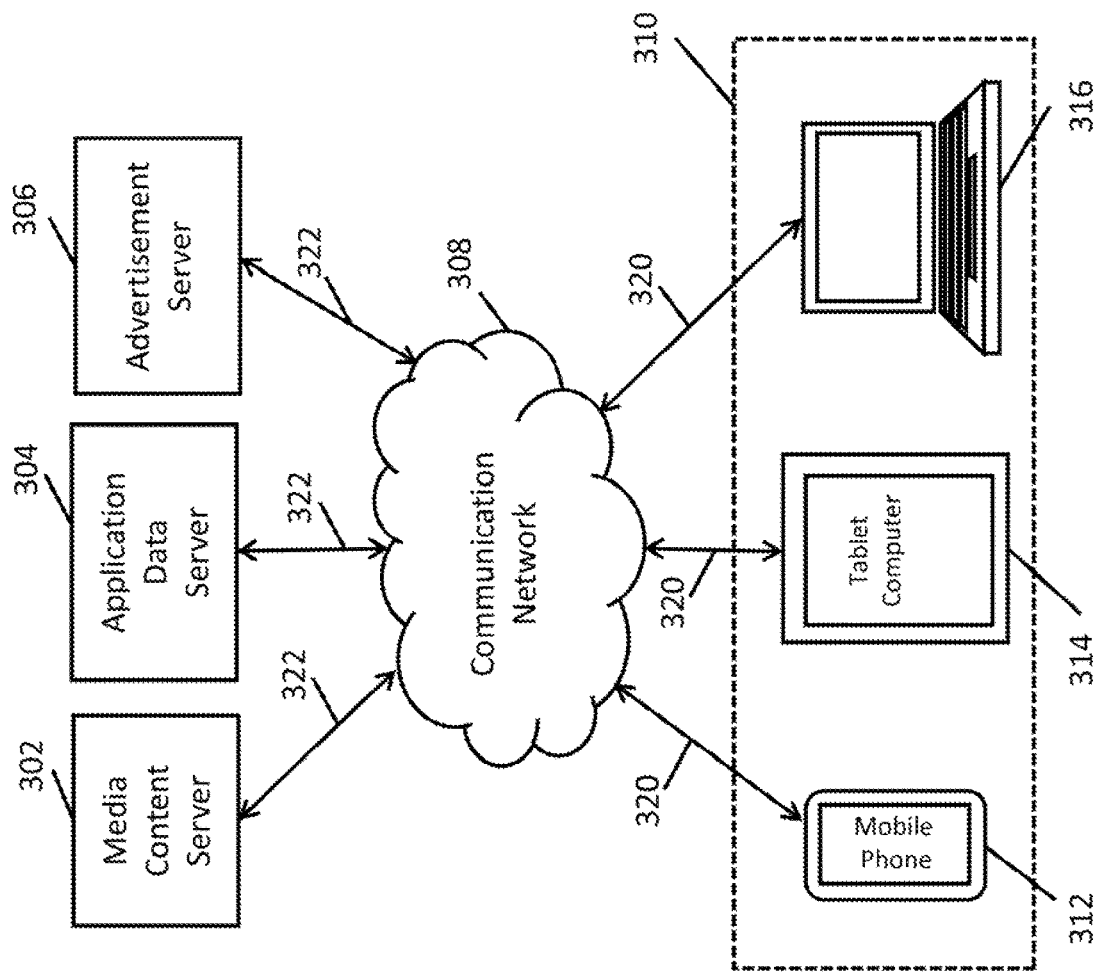
FIG. 3 shows a generalized schematic diagram of an illustrative system suitable for implementation of the mechanisms described herein for presenting advertisements during background presentation of media content in accordance with some embodiments of the disclosed subject matter.

Turning to FIG. 3, an example 300 of an illustrative system suitable for implementations of the mechanisms for presenting advertisements during background presentation of media content that can be used in accordance with some embodiments is shown. As illustrated, hardware 300 can include one or more servers, including a media content server 302, an application data server 304, an advertisement server 306, a communication network 308, and one or more user devices 310, such as user devices 312, 314 and 316. User devices 310 can be connected by one or more communication links 320 to communication network 308 that can be linked via one or more communication links (e.g., communication links 322) to media content server 302, application data server 304, and/or advertisement server 306. Communications links 320 and/or 322 can be any communications links suitable for communicating data among user devices 310 and/or servers 302, 304, and/or 306 such as network links, dial-up links, wireless links, hard-wired links, any other suitable communications links, or any suitable combination of such links.

In some embodiments, media content server 302 can be any suitable server for accessing, generating, storing, and/or transmitting media content items such as image data, video data and/or audio data. For example, in some embodiments, media content server 302 can be a server that receives a request for a particular media content item, and delivers the requested media content item in response to the request. Media content provided by media content server 302 can be any suitable content. For example, in some embodiments, media content can include any suitable video content, audio content, image content, and/or text content. As a more particular example, media content can include content such as television programs, movies, music videos, cartoons, sound effects, audio books, streaming live content (e.g., a streaming radio show, live concert show, and/or any other suitable type of streaming live content), user generated content, and/or any other suitable type of media content. In some embodiments, media content server 302 can be omitted.

Application data server 304 can be any suitable server for receiving, storing, generating and/or delivering information relating to user device 310 in some embodiments. For example, in some embodiments, application data server 304 can receive media content and advertisement requests from user device 310 and can deliver media content and advertisements to user device 310. As another example, in some embodiments, application data server 304 can receive information related to one or more applications installed on and/or associated with any suitable user device 310 and compare the information with advertisements received by advertisement server 306. The information received from user device 310 can include any suitable content (e.g., any suitable text, images, and/or any other suitable content). In some embodiments, application data server 304 can be omitted.

Advertisement server 306 can be any suitable server for receiving, storing, and/or delivering advertisements in some embodiments. For example, in some embodiments, advertisement server 306 can receive advertisement requests from user device 310 and/or media content server 302 and can deliver advertisements to user device 310. Advertisements received by advertisement server 306 can be associated with any suitable user device 310 and can include any suitable content (e.g., any suitable text, images, icons, media content, and/or any other suitable content). In some embodiments, advertisement server 306 can be omitted.

Communication network 308 can be any suitable combination of one or more wired and/or wireless networks in some embodiments. For example, communication network 308 can include any one or more of the Internet, a mobile data network, a satellite network, a local area network, a wide area network, a telephone network, a cable television network, a WiFi network, a WiMax network, and/or any other suitable communication network.

User devices 310 can include any one or more user devices suitable for receiving and/or presenting video content and/or audio content. For example, in some embodiments, user devices 310 can include mobile devices, such as a mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 310 can include non-mobile devices such as a desktop computer, a set-top box, a television, a streaming media player, a game console, or any other suitable non-mobile device.

In some embodiments, a content item can be presented using a first computing device 310, such as a smart television, a set-top box, a digital media receiver, etc., and advertisements can be presented using a second computing device 310, such as a tablet computer, a smartphone, a PDA, etc.

Although media content server 302, application data server 304, and advertisement server 306 are illustrated as separate devices, any one or more of these devices can be combined into one device in some embodiments. Also, although only one each of media content server 302, application data server 304, and advertisement server 306 are shown in FIG. 3 to avoid over-complicating the figure, any suitable one or more of each device can be used in some embodiments.

Although three user devices 312, 314 and 316 are shown in FIG. 3 to avoid over-complicating the figure, any suitable number of each of these devices, and any suitable types of these devices, can be used in some embodiments.

Media content server 302, advertisement server 306, and user devices 310 can be implemented using any suitable hardware in some embodiments. For example, in some embodiments, devices 302, 304, 306, 312, 314, and 316 can be implemented using any suitable general purpose computer or special purpose computer and/or server. In a more particular example, a mobile phone may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

The mechanisms described herein for presenting an advertisement during background presentation of media content and/or for displaying content to a user can be implemented in computing devices 310 as software, firmware, hardware, or any suitable combination thereof.

In some implementations, the mechanism described herein can include client-side software, hardware, or both. For example, the mechanisms described herein can encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches). As another example, the mechanisms described herein can encompass a computer program that causes a processor to execute the user input interface application. In one particular embodiment, the one or more applications can include client-side software, server-side software, hardware, firmware, or any suitable combination thereof. For example, the application (s) can encompass a computer program written in a programming language recognizable by media playback device 314, mobile device 312, and/or servers 302-306 that is executing the application(s) (e.g., a program written in a programming language, such as, Java, C, Objective-C, C++, C#, Javascript, Visual Basic, HTML, XML, ColdFusion, any other suitable approaches, or any suitable combination thereof.)

In some embodiments, hardware processor 402 can include any suitable hardware processor, such as a microprocessor, a micro-controller, digital signal processor(s), dedicated logic, and/or any other suitable circuitry for controlling the functioning of a general purpose computer or a special purpose computer. In some embodiments, hardware processor 402 can be controlled by a server program stored in memory and/or storage 404 of a server (e.g., such as one of servers 302-306). For example, the server program can cause hardware processor 402 to determine whether a media content item is being presented in a background mode, determine whether an advertisement is to be presented, cause an advertisement to be presented on a user device 310, and/or perform any other suitable actions. In some embodiments, hardware processor 402 can be controlled by a computer program stored in memory and/or storage 404 of user device 310. For example, the computer program can cause hardware processor 402 to request a media content item, request an advertisement based on instructions associated with the media content item and/or associated with a user interface for presenting the media content item, cause the media content item and/or the advertisement to be presented, and/or perform any other suitable actions.

Memory and/or storage 404 can be any suitable memory and/or storage for storing programs, data, media content, and/or any other suitable information in some embodiments. For example, memory and/or storage 404 can include random access memory, read-only memory, flash memory, hard disk storage, optical media, and/or any other suitable storage.

Input device controller 406 can be any suitable circuitry for controlling and receiving input from one or more input devices 408 in some embodiments. For example, input device controller 406 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 410 can be any suitable circuitry for controlling and driving output to one or more display/audio output circuitries 412 in some embodiments. For example, display/audio drivers 410 can be circuitry for driving an LCD display, a speaker, an LED, or any other type of output device.

Figure 4:
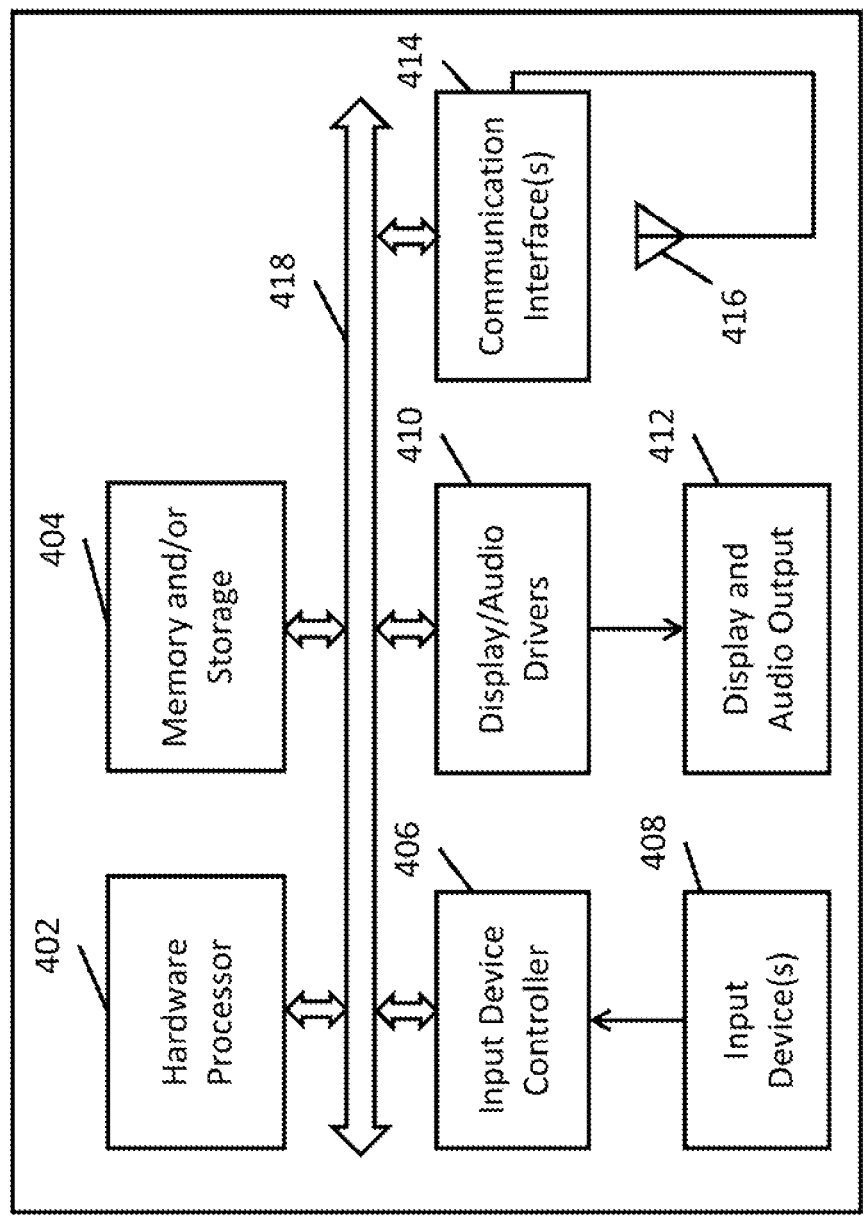
FIG. 4 shows a detailed example of a server and a client device of FIG. 3 that can be used in accordance with some embodiments of the disclosed subject matter.

Communication interface(s) 414 can be any suitable circuitry for interfacing with one or more communication networks, such as network 308 as shown in FIG. 4. For example, interface(s) 414 can include network interface card circuitry, wireless communication circuitry, and/or any other suitable type of communication network circuitry.

Antenna 416 can be any suitable one or more antennas for wirelessly communicating with a communication network in some embodiments. In some embodiments, antenna 416 can be omitted when not needed.

Bus 418 can be any suitable mechanism for communicating between two or more components 402, 404, 406, 410, and 414 in some embodiments.

Any other suitable components can be included in hardware 400 in accordance with some embodiments.

Figure 5:
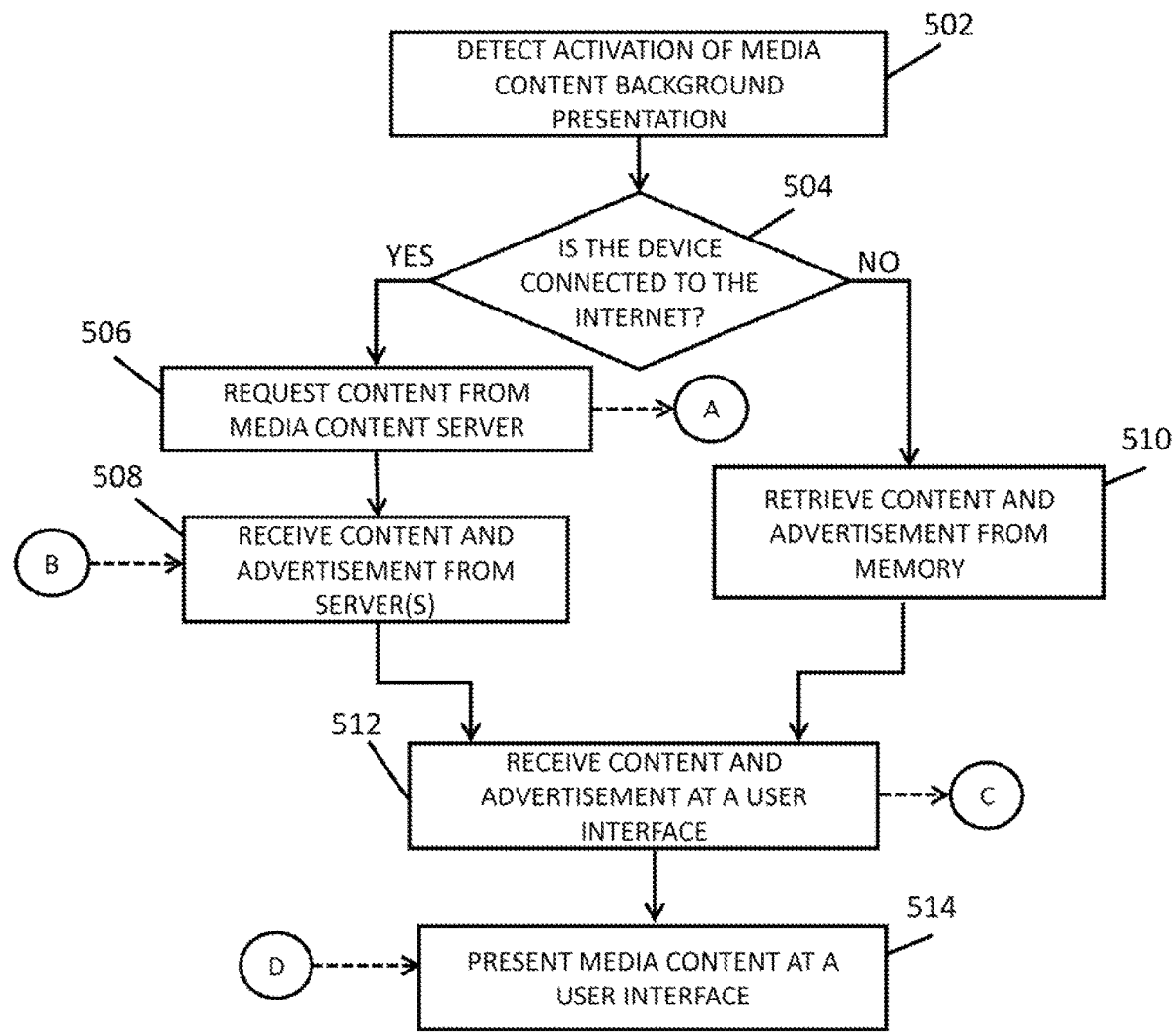
FIG. 5 shows an example of a process for presenting advertisements during background presentation of media content in accordance with some embodiments of the disclosed subject matter.
Figure 6:
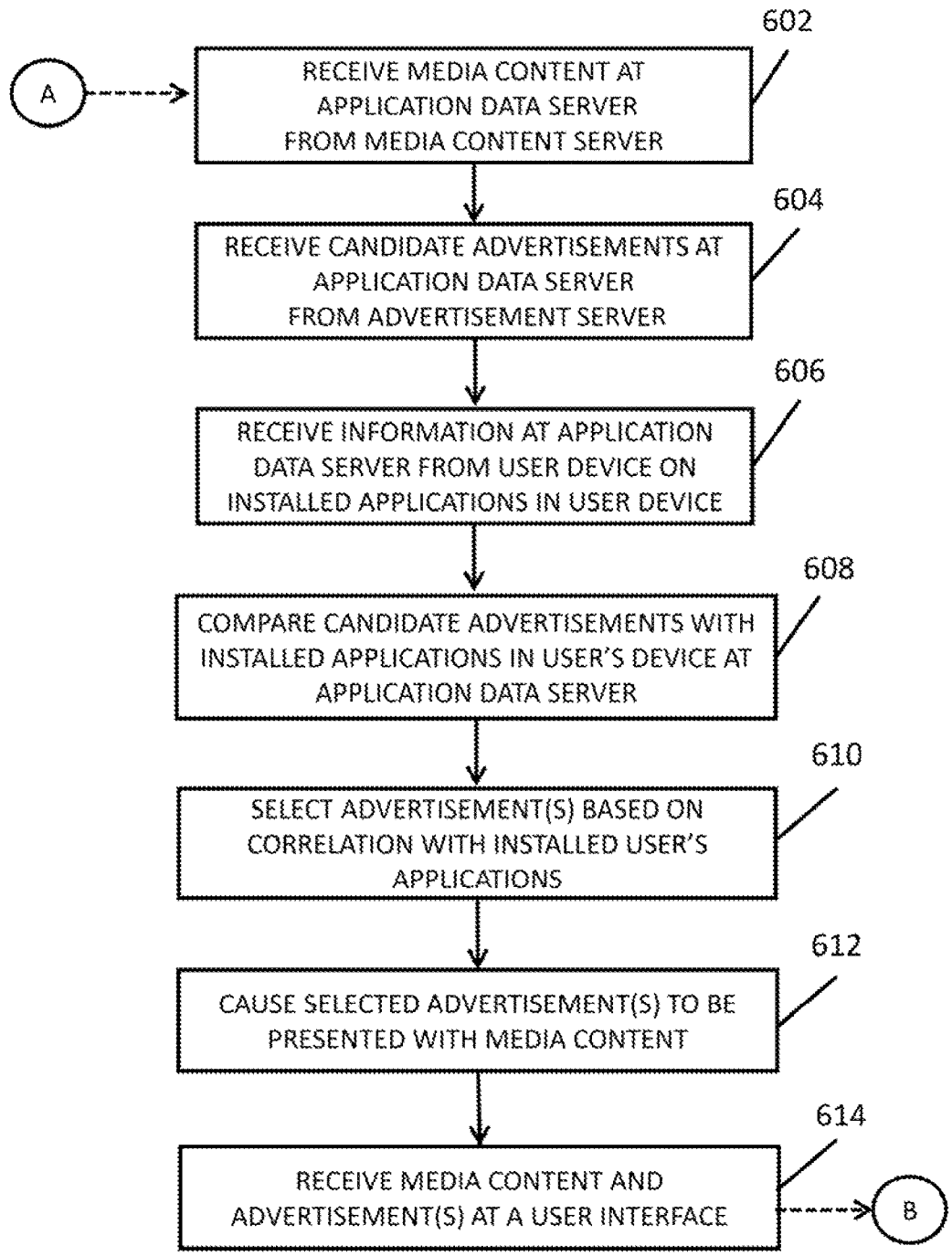
FIG. 6 shows an example of a process for selecting an advertisement in accordance with some embodiments of the disclosed subject matter.
Figure 7:
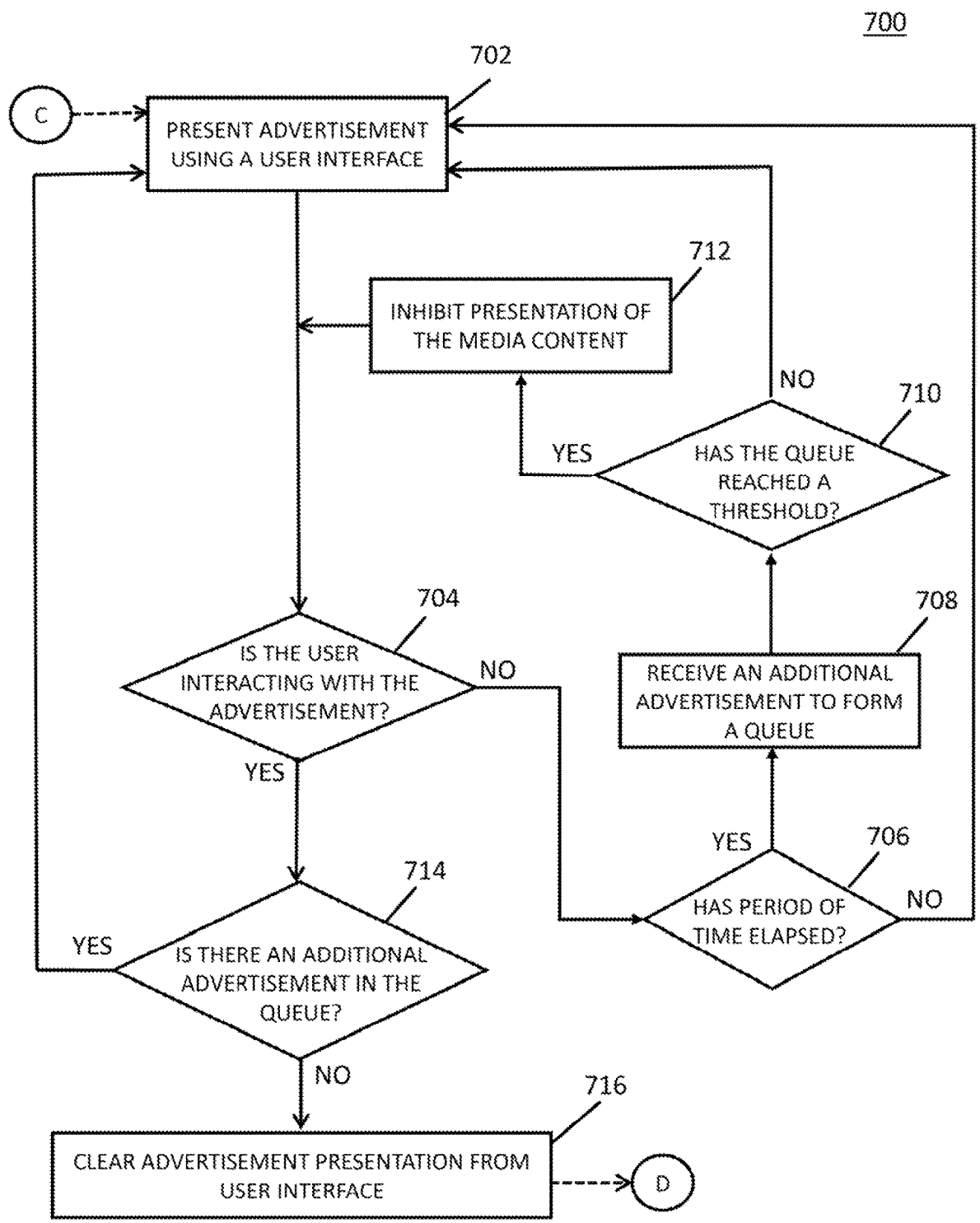
FIG. 7 shows an example of a process for presenting multiple advertisements during background presentation of media content in accordance with some embodiments of the disclosed subject matter.

FIGS. 5, 6, and 7 show illustrative examples 500, 600, and 700, respectively, of processes for presenting advertisements during background presentation of media content that can be performed in a user device 310, a media content server 302, a data application server 304, and an advertisement server 306, respectively, in accordance with some embodiments.

More particularly, process 500 of FIG. 5 shows an example of a process for presenting advertisements during background presentation of media content in accordance with some embodiments of the disclosed subject matter. Process 500 can detect a media content item in background presentation mode whereby it inhibits the presentation of video data, request a content media item, and receive a content media item and an advertisement to be presented using the media content presentation application, in accordance with some embodiments. Such a process can be executed by any suitable device, such as user device 310 in some embodiments. As illustrated, at 502, process 500 can begin by detecting the activation of background presentation of a media content item. In some embodiments, process 500 can determine that the application for presenting media content is in a presentation mode that inhibits the presentation of video data of a media content item being presented, where the media content item can include audio data and/or video data In some embodiments, the activation of the media content presentation application in the presentation mode can be detected in response to a user activating multiple applications, activating a control key, and/or performing any other suitable action.

In some embodiments, process 500 can detect that the media content is being presented as background media content when user device 310 is in a locked mode that can occur in response to user device 310 being inactive for a pre-determined amount of time and/or the user manually locking the screen of user device 310. In some embodiments, process 500 can detect when the media content is being presented as background media content when user device 310 (e.g., mobile phone 312) is causing a media content item to be presented on another user device of user devices 310 (e.g., a television).

At 504, process 500 can determine whether user device 310 is connected to the Internet and/or any other suitable network. For example, in some embodiments, the determination can be made by sending and receiving data over a communication network 308. Any suitable technique or combinations of techniques can be used to determine that device 310 that is executing process 500 is connected to the Internet.

If process 500 determines at 504 that user device 310 is connected to the Internet ("YES" at 504), process 500 can proceed to 506 and request a media content item from a server (e.g., media content server 302). In some embodiments, the advertisement can be requested by user device 310 from advertisement server 306 based on instructions received by the user device such as an advertisement call. At 508, user device 310 executing process 500 can receive the media content item from content server 302 and/or application data server 304 and an advertisement from advertisement server 306. The media content item and/or advertisement can be received in any suitable manner. For example, in some embodiments, the advertisement can be retrieved by requesting and receiving video, images and/or audio associated with the advertisement. As another example, in some embodiments, the advertisement can be retrieved by requesting and receiving a link or pointer that can be used to access video, images and/or audio associated with the advertisement. In some embodiments, the advertisement can be requested by user device 310 based on instructions received by user device 310.

Otherwise, if process 500 determines at 504 that user device 310 is not connected to the Internet ("NO" at 504), process 500 can cause user device 310, at 510, to retrieve a media content item and/or advertisement from user device 310. The media content item and/or advertisement can be retrieved in any suitable manner. For example, in some embodiments, the media content item and/or advertisement can be stored in memory and/or storage 404 of user device 310 at a first time, and retrieved from the memory and/or storage 404 of user device 310 at a later time.

Process 500 can cause the user device to receive the media content item and/or advertisement from a server, at 508, or the user device memory, at 510, based on whether a connection to the Internet has been established, at 504. Process 500 can then send the retrieved media content item and/or advertisement to the user interface at 512. The media content item and/or advertisement can be received in any suitable manner in some embodiments. For example, in some embodiments, the media content item and advertisement can be received in any suitable protocol using any suitable type of communication interface, such as HTTP or TCP/IP.

At 514, process 500 can present the media content item using user interface 100 of user device 310.

FIG. 6 shows an example of a process 600 for selecting an advertisement when multiple advertisements are presented during background presentation of media content. In some embodiments, process 600 can be executed by media content server 302, application data server 304, and/or advertisement server 306 with user device 310 using communication network 308. As illustrated, process 600 can receive one or more requests for media content from user device 310 and receive information related to the media content from media content server 302 at application data server 304 at 602, in some embodiments. The requests can be sent in any suitable manner in some embodiments.

At 604, process 600 can receive information related to one or more candidate advertisements from advertisement server 306 at application data server 304. The one or more advertisements can be received in any suitable manner in some embodiments.

At 606, process 600 can receive information, at application data server 304, related to one or more applications installed on user device 310 using communication network 308. The information can be any suitable information and can be received in any suitable manner in some embodiments.

At 608, process 600 can compare, at application data server 304, the information related to one or more candidate advertisements with the applications installed in user device 310, in accordance with some embodiments. Any suitable technique or combination of techniques can be used to determine the applications installed on user device 310. For example, in some embodiments, process 600 can determine the applications installed on user device 310 using messages that can include an identifier of the application, and/or any other suitable form of identification, and can request and coordinate the actions of one or more installed applications on user device 310 to achieve a task. As another example, determining the applications installed in user device 310 can be done using stored web addresses/URLs that can provide identifying information, in any suitable form, for the applications installed on user device 310. In some embodiments, process 600 can associate the user with the user device 310 and coordinate with the application data server 304 that stores data on applications installed on user device 310 by the user.

At 610, process 600 can select one or more of the candidate advertisements based on a correlation between the applications installed on user device 310 and the candidate advertisements. For example, in some embodiments, the content of a candidate advertisement can be analyzed and, its similarity to the one or more applications installed on user device 310 can be used to determine a correlation measurement. In some embodiments, a candidate advertisement can be identified by a unique number that can be correlated to a number identifying one or more applications installed on user device 310. As another example, the metadata of the advertisement can be compared with metadata of applications installed on user device 310, in accordance with some embodiments.

In situations in which the systems described herein collect personal information about users or applications installed on a user device, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

At 612, process 600 can cause the selected advertisements to be presented in association with the media content item. For example, in some embodiments, process 600 can cause the one or more selected advertisements to be presented at a beginning of presentation of the media content item. As another example, process 600 can cause the one or more selected advertisements to be presented at an end of presentation of the media content item, in accordance with some embodiments. As yet another example, in some embodiments, process 600 can cause the one or more selected advertisements to be presented at one or more points between the beginning and the end of presentation of the media content item.

At 614, process 600 can receive the media content item and the one or more advertisements at user device 310 for presentation using user interface 100. The media content item and the advertisement can be sent in any suitable manner in some embodiments.

FIG. 7 shows an example 700 of a process for presenting multiple advertisements during background presentation of media content in accordance with some embodiments. In some embodiments, process 700 can be executed by user device 310. As illustrated, at 702, process 700 can cause the advertisement to be presented using user interface 100 of user device 310. In some embodiments, process 700 can cause the advertisement to be presented in a mode where it inhibits the presentation of video data of a media content item that includes video. In such embodiments, the media content item can include audio data, image data (e.g., a thumbnail), text data and/or any other suitable content to be presented in connection with presentation of the media content item. Furthermore, in some embodiments, process 700 can cause the advertisement to be presented when user device 310 that is executing process 700 is in a locked mode where at least one display of user device 310 is active. User device 310 can enter a locked mode based on any suitable conditions being met, such as selection of a specified control element. In some embodiments, presentation of the advertisement can happen when the user device is causing a media content item to be presented on another of user devices 310, such as a television.

At 704, process 700 can determine whether an input has been received that indicates interaction with the advertisement presented at 702. Interaction with the advertisement can be determined in any suitable manner in some embodiments. For example, in some embodiments, an input can be received (e.g., using an input device such as a touch screen or a mouse) corresponding to advertisement interaction elements 120 and/or 122 of the user interface as described above in connection with FIGS. 1-2. As another example, in some embodiments, an input can be received corresponding to advertisement interaction elements 120 and/or 122 of the user interface using any suitable manner such as input devices 408.

If process 700 determines at 704 that an interaction with the advertisement has not been received ("NO" at 704), process 700 can proceed to 706 to determine if a pre-determined period of time has elapsed. In some embodiments, an amount remaining or elapsed in the pre-determined period of time may or may not be presented by user device 310. The pre-determined period of time can be any suitable period of time, which can be determined by any suitable factors. For example, in some embodiments, a pre-determined period of time can be determined based on the similarity of the presented advertisement with the applications installed on user device 310 and can be presented at 118 as described above on connection with FIGS. 1-2.

If process 700 determines, at 706, that the pre-determined period of time has not elapsed ("NO" at 706), process 700 can return to 702 and can continue to present the advertisement.

Otherwise, if process 700 determines at 706, that the pre-determined period of time has elapsed ("YES" at 706), process 700 can proceed to 708 and cause an additional advertisement to be presented (e.g., from among the selected advertisements obtained from advertisement server 306.) The additional advertisement can be presented in addition to or in lieu of the advertisement originally presented at 702 and in relation to the advertisement presented at 702 in any suitable arrangement. In some embodiments, the additional advertisement can be presented as part of a queue of advertisements with the advertisement presented at 702 and/or any other advertisements presented as part of the queue of advertisements.

At 710, process 700 can determine whether a number of advertisements in the queue has reached a threshold. The threshold of advertisements can be determined in any suitable manner. For example, in some embodiments, the threshold can be set based on the data stored in advertisement server 306 and/or user device 310. In some embodiments, the threshold can be set based on the size of memory and/or storage 404 of user device 310 allotted to presenting advertisements.

If process 700 determines, at 710, that the number of advertisements in the queue has not reached the threshold ("NO" at 710) process 700 can return to 702 and continue to present the advertisements in user interface 100.

If, however, process 700 determines, at 710, that the number of advertisements in the queue has reached the threshold ("YES at 710"), process 700 can proceed to 712 and inhibit further presentation of the media content item and/or inhibit a new media content item from being requested, and/or presented by user device 310 executing process 700. For example, in some embodiments, background presentation of media content executed by process 700 can inhibit the presentation of the video data and/or audio data comprising the media content item. As another example, process 700 can cause user device 310 to present a notification indicating that the presentation of the media content can be re-started by interacting with the queued advertisements.

Process 700 can proceed to 704 to determine whether user interface 100 is presenting advertisement 206, presented first in the queue of advertisements as described in connection with FIG. 2, and prompting the user to interact with advertisement interaction elements 120 and/or 122. If process 700 determines that the user interface 100 has executed advertisement interaction elements 120 and 122 then process 700 can proceed to 714.

If, at 714, process 700 determines that there is an additional advertisement in the queue of advertisements ("YES" at 714), process 700 can return to 702 and cause a next advertisement in the queue to be presented.

Otherwise, if process 700 determines that there is no additional advertisement in the queue of advertisements ("NO" at 714), then process 700 can proceed to 716 and inhibit advertisements from being presented.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media It should be understood that the above described steps of the processes of FIGS. 5-7 can be executed or performed in any order or sequence not limited to the order and sequence shown and described in the figures. Also, some of the above steps of the processes of FIGS. 5-7 can be executed or performed substantially simultaneously where appropriate or in parallel to reduce latency and processing times.

It should also be noted that, as used herein, the term mechanism can encompass hardware, software, firmware, or any suitable combination thereof.

Accordingly, methods, systems, and media for presenting advertisements during background presentation of media content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting advertisements during video presentation, the method comprising:

receiving, by a client device, a media content item to be presented, wherein the media content item comprises video content that includes audio data to be presented during presentation of the video data;

receiving, by the client device, a first advertisement;

determining that an interaction with a previous advertisement was not detected within a pre-determined period of time;

responsive to the determination that an interaction with the previous advertisement was not detected within the pre-determined period of time, adding, by the client device, the first advertisement to a queue of advertisements stored in memory of the client device;

determining, by the client device, that a number of advertisements in the queue of advertisements for presentation is greater than or equal to a threshold number of advertisements;

inhibiting, by the client device, presentation of video data of the media content item, by a video presentation application installed on a user device, in response to determining that the number of advertisements is greater than or equal to the threshold:

retrieving, from the queue of advertisements stored in memory of the client device by the client device and responsive to determining that the number of advertisements in the queue of advertisements is greater than or equal to the threshold, an advertisement to he presented in a user interface during presentation of the media content item presenting, by the client device, the audio data of the media content item, using the video presentation application, responsive to and while inhibiting presentation of the video data of the media content item; and presenting, by the client device, the advertisement on the user device during presentation of the audio data of the media content, responsive to and while inhibiting presentation of the video data of the media content item.

2. The method of claim 1, wherein presenting the audio data of the media content item further comprises causing the audio data. of the media, content item to be presented. by a remote device.

3. The method of claim 1, wherein the advertisement is first presented at a point in time corresponding to a.t lea.st one of: a beginning of the media content item, an end of the media content item, and a point between the beginning and the end of the media content item.

4. The method of claim. 1, further comprising:
determining, by the client device, that a pre-determined period of time has elapsed since the advertisement was first presented; and
presenting, by the client device, an additional advertisement, while inhibiting presentation of the video data of the media content item, responsive to the determination that the video presentation application is in the presentation mode, in response to determining that the pre-determined period of time has elapsed.

5. The method of claim 1, further comprising:
detecting, by the client device, a user action indicative of user attention to at least a portion of the presented advertisement and
presenting, by the client device via the user interface, additional information, responsive to detection of the user action.

6. A system for presenting advertisements during video presentation, the system comprising:
a communication interface of a client device configured to:
receive a media content item to be presented, wherein the media content item comprises video content that includes audio data to he presented during presentation of the video data,
receive a first advertisement, and
retrieve, responsive to a determination that a number of advertisements in a queue of advertisements stored in memory of the client device is greater than or equal to a threshold number of advertisements, an advertisement from the queue of advertisements to be presented in a user interface during presentation of the media content item; and
a hardware processor of the client device configured to:
determining that an interaction with a previous advertisement was not detected within a pre-determined period of time:
responsive to the determination that an interaction with the previous advertisement was not detected within the pre-determined period of time add the first advertisement to the queue of advertisements,
determine that the number of advertisements in the queue of advertisements for presentation is greater than or equal to the threshold number of advertisements,
inhibit presentation of video data of the media content item, by a video presentation application installed on a user device, in response to determining that the number of advertisements is greater than or equal to the threshold,
present the audio data of the media content item using the video presentation application, responsive to and while inhibiting presentation of the video data of the media content item.
present the advertisement on the user device during presentation of the audio data of the media content, responsive to and while inhibiting presentation of the video data of the media content item.

7. The system of claim 6, wherein the at least one hardware processor is further programmed to cause the audio data of the media content item to be presented by a remote device.

8. The system of claim 6, wherein the advertisement is first caused to be presented at a point in time corresponding to at least one of: a beginning of the media content item, an end of the media content item, and a point between the beginning and the end of the media content item.

9. The system of claim 6, wherein the at least one hardware processor is further programmed to:
determine that a pre-determined period of time has elapsed since the advertisement was first presented; and
present an additional advertisement, while inhibiting presentation of the video data of the media content item, responsive to the determination that the video presentation application is in the presentation mode, in response to determining that the pre-determined period of time has elapsed.

10. The system of claim 6, wherein the at least one hardware processor is further programmed to:
detect a user action indicative of user attention to at least a portion of the presented advertisement, and
present, via the user interface, additional information, responsive to detection of the user action.

11. A non-transitory computer readable medium containing computer executable instructions that, when executed by a processor of a client device, cause the processor to perform a method for presenting advertisements during video presentation, the method comprising:
receiving a media content item to be presented, wherein the media content item comprises video content that includes audio data to be presented during presentation of the video data;
receiving a first advertisement;
determining that an interaction with a previous advertisement was not detected within a pre-determined period of time;
responsive to the determination that an interaction with the previous advertisement was not detected within the re-determined eriod of time adding the first advertisement to a queue of advertisements stored in memory of the client device;
determining that a number of advertisements in the queue of advertisements for presentation is greater than or equal to a threshold number of advertisements;
inhibiting presentation of video data of the media content item, by a video presentation application installed on a user device, in response to determining that the number of advertisements is greater than or equal to the threshold;
retrieving, from the queue of advertisements stored in memory of the client device and responsive to determining that the number of advertisements in the queue of advertisements is greater than or equal to the threshold, an advertisement to be presented in a user interface during presentation of the media content item;
presenting the audio data of the media content item, using the video presentation application, responsive to and while inhibiting presentation of the video data of the media content item;
presenting the advertisement on the user device during presentation of the audio data of the media. content, responsive to and while inhibiting presentation of the video data the media content item.

12. The non-transitory computer-readable medium of claim 11, wherein the method further comprises causing the audio data of the media content item to be presented by a remote device.

13. The non-transitory computer-readable medium of claim 11, wherein the advertisement is first caused to be presented at a point in time corresponding to at least one of: a beginning of the media content item, an end of the media content item, and a point between the beginning and the end of the media content item.

14. The non-transitory computer-readable medium of claim 11, wherein the method further comprises:
   determining that a. pre-determined period of time has elapsed since the advertisement was first presented: and
   presenting an additional advertisement, while inhibiting presentation of the video data of the media. content item, responsive to the determination that the video presentation application is in the presentation mode, in response to determining that the pre-determined period of time has elapsed.

15. The non-transitory computer-readable medium of claim 11, wherein the method. further comprises:
   detecting a user action indicative of user attention to atleast a portion of the presented advertisement; and
   presenting, via the user interface, additional information, responsive to detection of the user action.

* * * * *